(12) United States Patent
Li et al.

(10) Patent No.: US 10,680,498 B2
(45) Date of Patent: Jun. 9, 2020

(54) MOTOR AND ELECTRIC EQUIPMENT WITH THE SAME

(71) Applicant: Johnson Electric S.A., Murten (CH)

(72) Inventors: Min Li, Shenzhen (CN); Xiaolin Zhang, Shenzhen (CN); Shaopeng Mo, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 129 days.

(21) Appl. No.: 15/951,043

(22) Filed: Apr. 11, 2018

(65) Prior Publication Data

US 2018/0301960 A1    Oct. 18, 2018

(30) Foreign Application Priority Data

Apr. 12, 2017    (CN) .......................... 2017 1 0242290

(51) Int. Cl.
*H02K 11/30* (2016.01)
*H02K 11/33* (2016.01)
*H02K 11/215* (2016.01)

(52) U.S. Cl.
CPC ........... *H02K 11/215* (2016.01); *H02K 11/33* (2016.01); *H02K 2211/03* (2013.01)

(58) Field of Classification Search
CPC .. H02K 11/215; H02K 11/33; H02K 2211/03; H02K 11/30

USPC ....................................................... 310/68 B
See application file for complete search history.

(56) References Cited

U.S. PATENT DOCUMENTS

| | | | | |
|---|---|---|---|---|
| 4,482,847 A | * | 11/1984 | Rudich, Jr. ........... | F16K 31/043 310/68 B |
| 9,641,109 B2 | * | 5/2017 | Ito ......................... | H02K 21/14 |
| 10,404,147 B2 | * | 9/2019 | Li .......................... | F04D 13/064 |
| 10,468,940 B2 | * | 11/2019 | Li .......................... | H02K 21/22 |
| 10,469,005 B2 | * | 11/2019 | Guo ....................... | H02P 6/20 |
| 2003/0098660 A1 | * | 5/2003 | Erdman ................. | H02K 11/33 318/400.22 |
| 2016/0094110 A1 | * | 3/2016 | Drye ...................... | H02K 5/15 310/68 B |
| 2016/0344322 A1 | * | 11/2016 | Sun ....................... | H02K 1/2706 |
| 2018/0301960 A1 | * | 10/2018 | Li .......................... | H02K 11/215 |

* cited by examiner

*Primary Examiner* — John K Kim
(74) *Attorney, Agent, or Firm* — Millman IP Inc.

(57) ABSTRACT

A motor includes a rotor and a stator. The stator includes a stator core, stator windings wound around the stator core and a circuit board fixed relative to the stator core. The circuit board includes a motor control circuit. The motor control circuit includes a magnetic sensor integrated circuit magnetically coupled with the rotor to detect a position of a magnetic pole of the rotor. The magnetic sensor integrated circuit includes a package housing near the magnetic poles of the rotor, an electronic circuit provided in the package housing, and a plurality of pins extending from the package housing and soldered on the circuit board. An electric equipment with the motor is also provided.

20 Claims, 8 Drawing Sheets

MOTOR AND ELECTRIC EQUIPMENT WITH THE SAME

CROSS REFERENCE TO RELATED APPLICATIONS

This non-provisional patent application claims priority under 35 U.S.C. § 119(a) from Patent Application No. 201710242290.4 filed in The People's Republic of China on 12 Apr. 2017.

FIELD OF THE INVENTION

The present application relates to a motor, and in particular to a control circuit board of a motor.

BACKGROUND OF THE INVENTION

A conventional synchronous motor may not have a motor control circuit board, and stator windings of the motor are directly powered by an AC power supply, so that the stator generates an alternating magnetic field, and the permanent magnet rotor is oscillated. If the rotor obtains enough kinetic energy, the oscillation amplitude of the rotor will continue to increase. Finally, the rotation of the rotor is quickly accelerated to synchronize with the alternating magnetic field of the stator. Due to the characteristics of the alternating current and the stop position of the permanent magnet rotor is not fixed, it is not guaranteed that the rotor rotates in the same direction every time it starts. In the prior art, the motor control circuit board can be set to control the energization of the stator winding according to the position of the magnetic pole of the rotor and the polarity of the AC power supply, so as to ensure that the rotor can rotate in the same direction each time the rotor is energized.

SUMMARY OF THE INVENTION

Accordingly, there is a desire to provide a motor with a new type of control circuit board.

A motor includes a rotor and a stator. The stator includes a stator core, stator windings wound around the stator core and a circuit board fixed relative to the stator core. The circuit board includes a motor control circuit. The motor control circuit includes a magnetic sensor integrated circuit magnetically coupled with the rotor to detect a position of a magnetic pole of the rotor. The magnetic sensor integrated circuit includes a package housing near the magnetic poles of the rotor, an electronic circuit provided in the package housing, and a plurality of pins extending from the package housing and soldered on the circuit board.

Preferably, a support sleeve is placed around the magnetic sensor integrated circuit.

Preferably, the support sleeve is mounted to the circuit board and shields the plurality of pins in the extending direction of the pins, distal ends of the pins away from the package housing are exposed out of the support sleeve.

Preferably, at least a part of the package housing of the magnetic sensor integrated circuit is inserted into the support sleeve.

Preferably, an end of the package housing away from the pins is exposed out of the support sleeve.

Preferably, the support sleeve comprises a main body defining a through hole penetrating opposite ends of the main body for receiving the pins of the magnetic sensor integrated circuit, one end of the main body is provided with a mounting portion fixed to the circuit board, and the other end of the main body is provided with a groove communicating with the through hole for receiving the package housing of the magnetic sensor integrated circuit.

Preferably, the circuit board is disposed on a side of the stator core, not more than four electronic components are mounted to the circuit board, and all the electronic components are disposed on a side of the circuit board facing the stator core.

Preferably, the motor is a single phase synchronous motor.

Preferably, the circuit board is also provided with a controllable bidirectional AC switch that is connected in series with the stator windings between an AC power supply and controlled by the magnetic sensor integrated circuit.

Preferably, the stator core comprises a pair of oppositely disposed pole portions, the magnetic sensor integrated circuit is disposed at one end of the circuit board near the pole portions, and the controllable bidirectional AC switch is disposed at the other end of the circuit board away from the pole portions.

Preferably, the stator core further comprises a bottom portion and two branches extending from opposite ends of the bottom portion, the pair of pole portions are respectively formed on the two branches, the stator further comprises a bobbin disposed between the stator core and the stator windings, the bobbin comprises two brackets respectively placed around the two branches, each bracket comprises two opposite end walls and a tubular portion connected between the end walls, the stator windings are wound around the tubular portions, the magnetic sensor integrated circuit and the controllable bidirectional AC switch are respectively disposed on sides of the two end walls of the bobbin facing away from the tubular portion.

Preferably, the circuit board is further provided with a thermal protection switch and a voltage reducer, the thermal protection switch and the voltage reducer are disposed between the two end walls of the bobbin.

Preferably, the circuit board is further provided with a thermal protection switch and a voltage reducer, the voltage reducer forms a series branch in series with the magnetic sensor integrated circuit, the series branch forms a parallel branch in parallel with the controllable bidirectional AC switch, the thermal protection switch, the stator windings and the parallel branch are connected in series between the AC power supply.

Preferably, the circuit board is further provided with a thermal protection switch and a voltage reducer, the voltage reducer and the magnetic sensor integrated circuit form a first series branch in series, the stator windings and the controllable bidirectional AC switch form a second series branch in series, the first series branch and the second series branch are connected in parallel to form a parallel branch, the thermal protection switch and the parallel branch are connected in series between the AC power supply.

An electric equipment is provided with the motor above.

Preferably, the electric equipment is a pump or a fan.

DETAILED DESCRIPTION OF THE PREFERRED EMBODIMENTS

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

Figure 1:
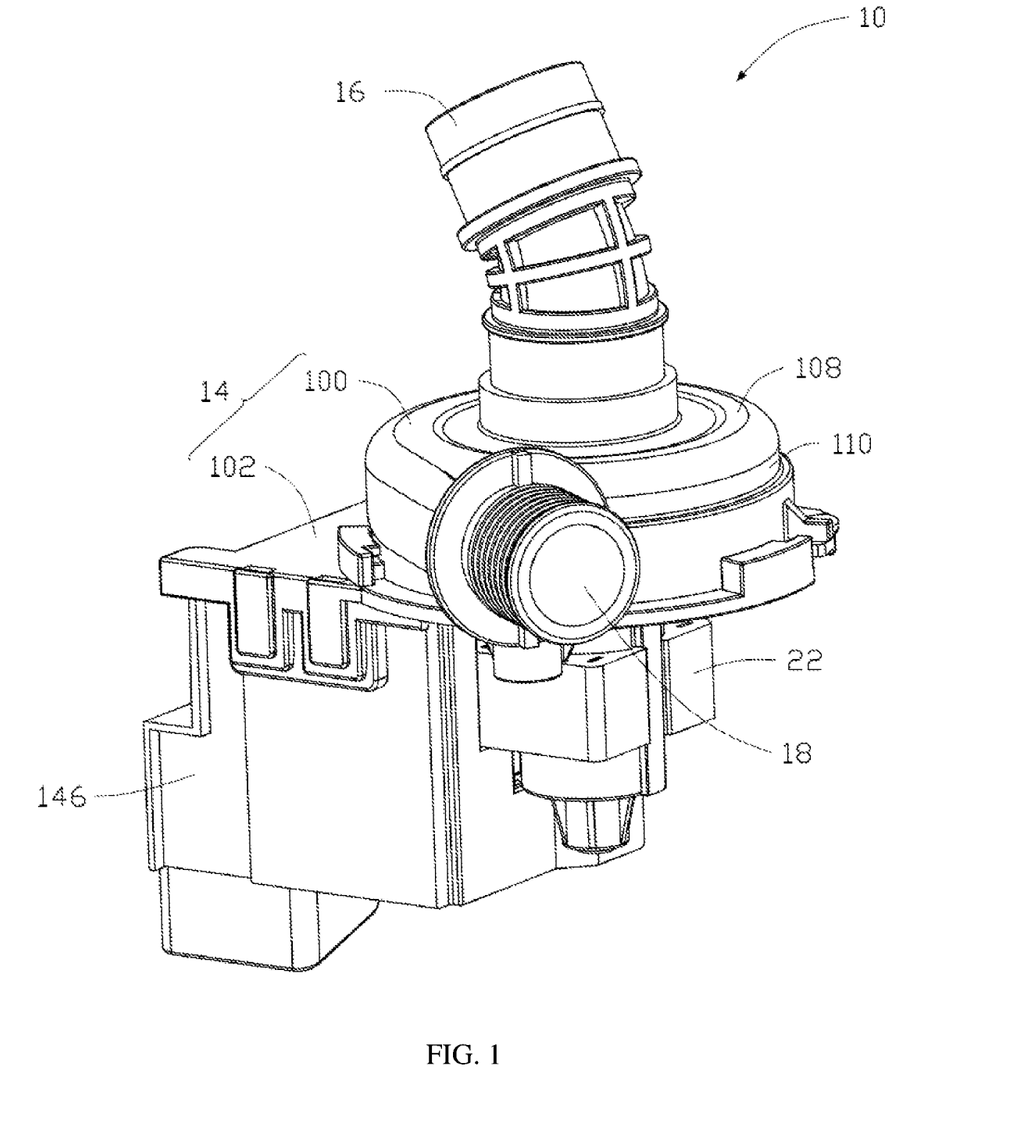
FIG. 1 illustrates a pump with a motor of an embodiment of the present application.
Figure 2:
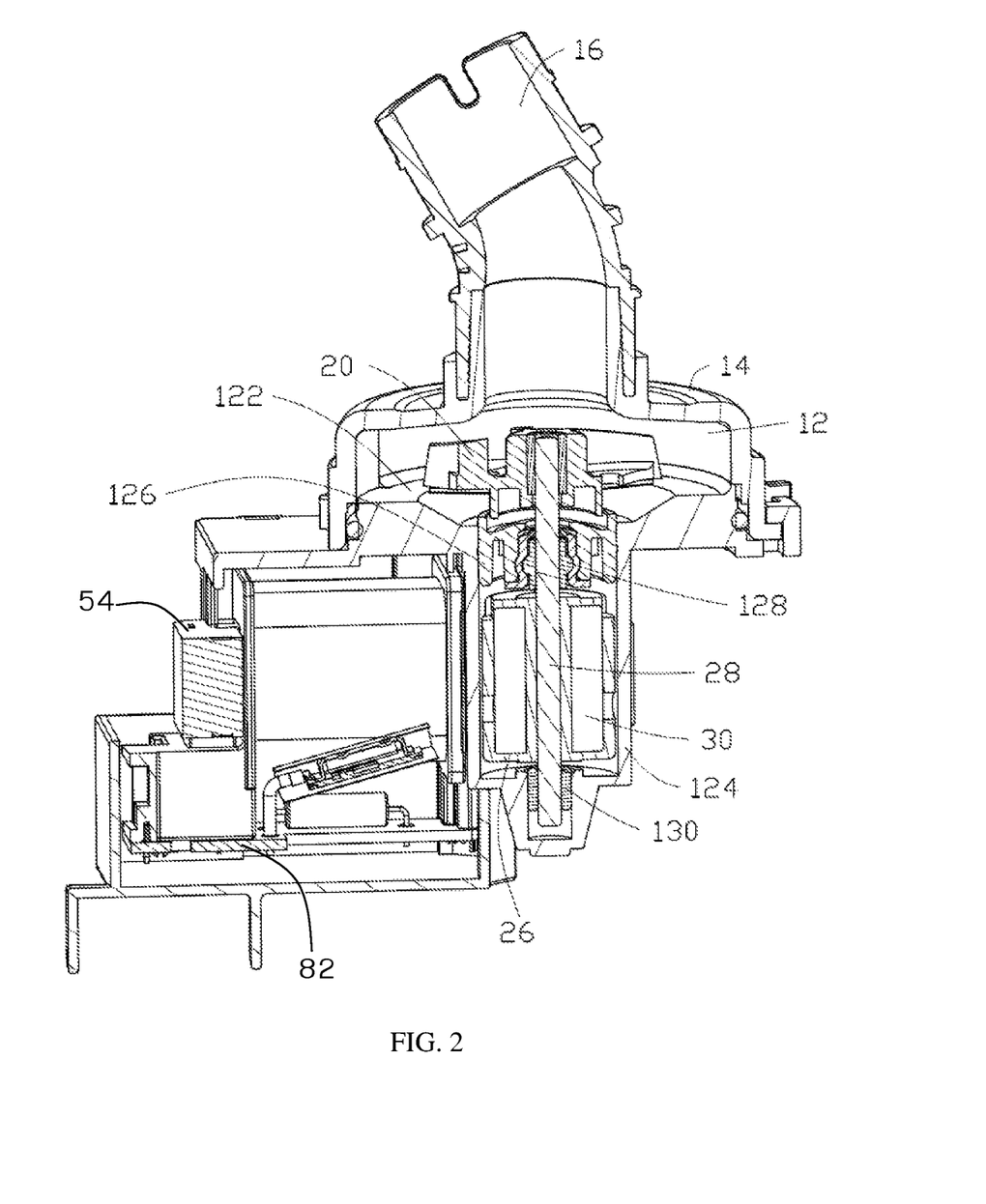
FIG. 2 is a sectional view of the pump of FIG. 1 along an axial direction of the pump.

Referring to FIGS. 1 and 2, a pump 10 according to an embodiment of the present invention includes a pump housing 14 having a pump chamber 12, an inlet 16 and an outlet 18 communicating with the pump chamber 12, an impeller 20 rotatably disposed in the pump chamber 12, and a motor 22 for driving the impeller 20. The motor 22 is preferably a single-phase synchronous motor including a stator and a rotor 26 that is rotatable relative to the stator. The rotor 26 includes a shaft 28 and a permanent magnet 30 fixed to the shaft 28.

Figure 3:
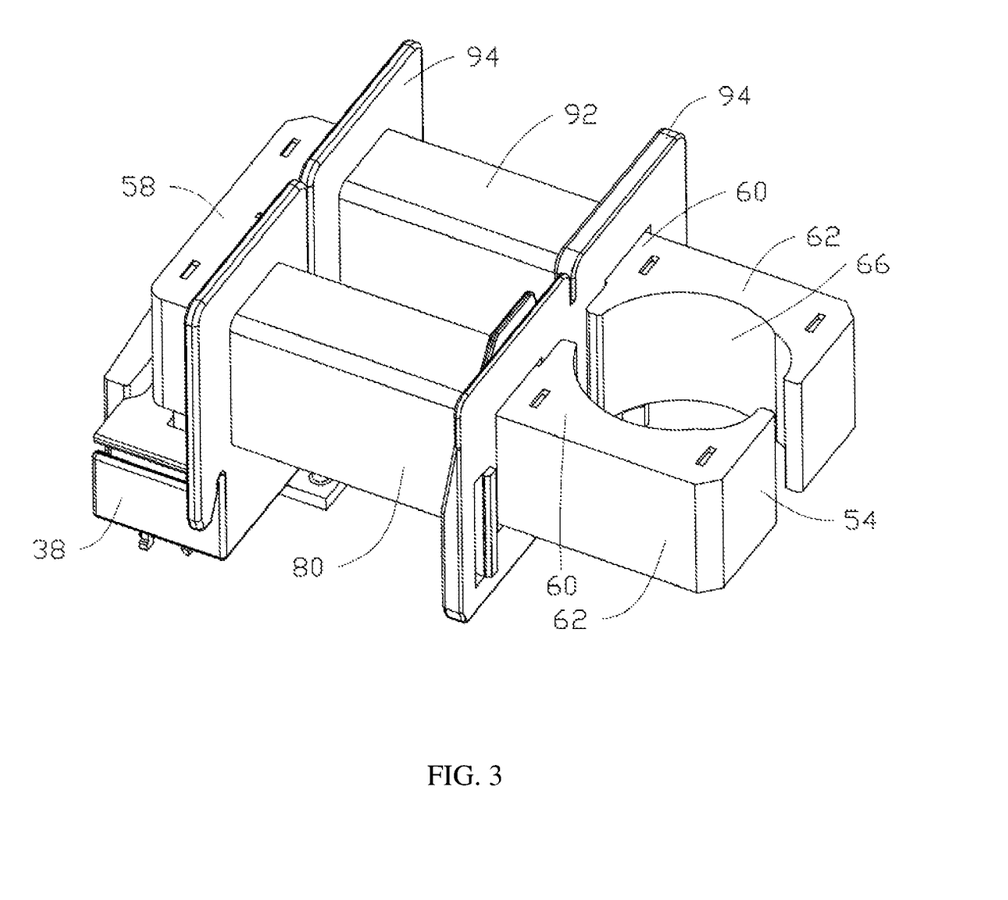
FIG. 3 illustrates a stator of the motor of the pump of FIG. 1, wherein stator windings are not shown.
Figure 4:
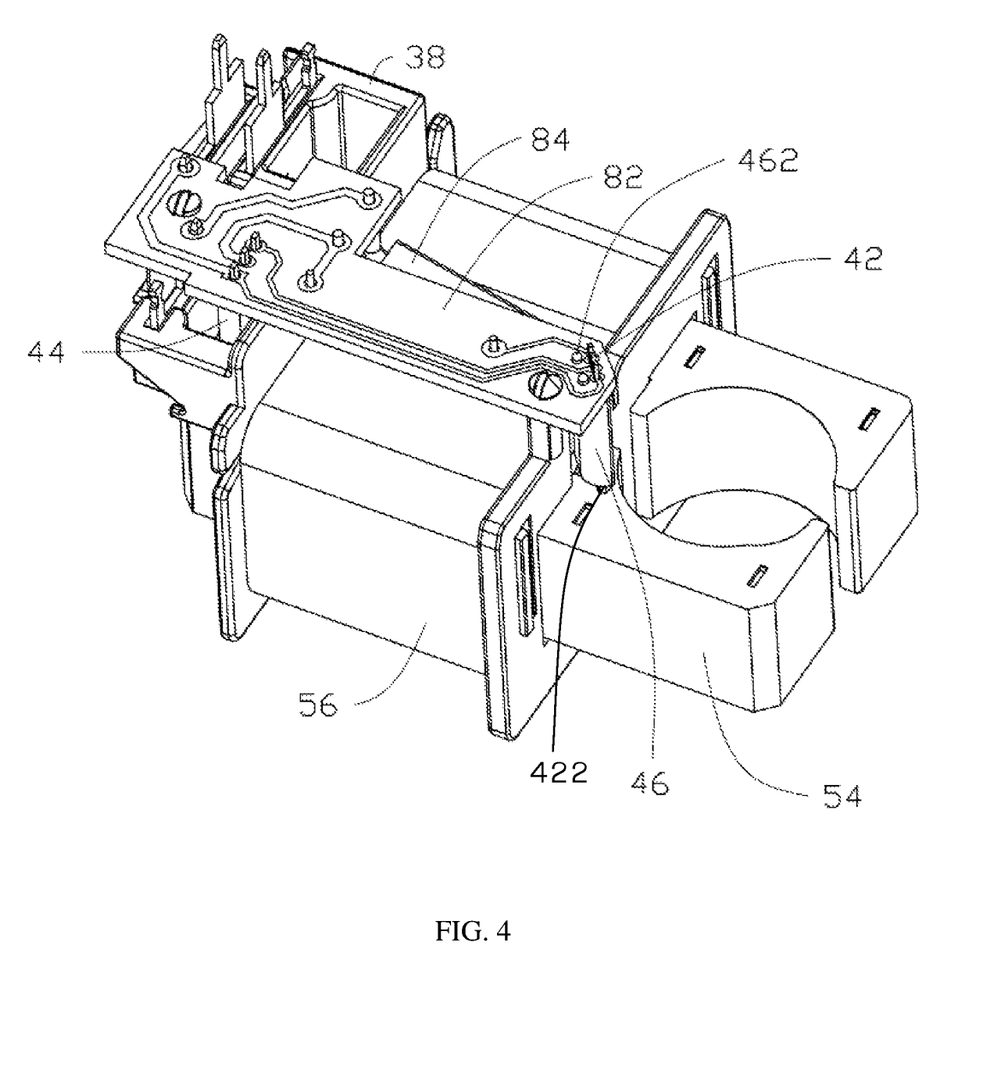
FIG. 4 is similar to FIG. 3, but shown in another aspect.

Referring to FIGS. 3 and 4, the stator includes a stator core 54 and stator windings 56 wound around the stator core 54. In the present embodiment, the stator core 54 includes a bottom portion 58, two branches 60 protruding from both ends of the bottom portion 58, and a pair of opposing pole portions 62 respectively provided on the two branches 60. Preferably, the bottom portion 58 is of a stripe type, and the two branches 60 extend from the both ends of the bottom portion 58 in parallel. The two pole portions 62 are oppositely disposed at distal ends of the two branches 60 away from the bottom portion 58. Each pole portion 62 has a concave pole arc surface 66, and an outer surface of the rotor 26 faces the pole arc surfaces 66 with an air gap therebetween.

Preferably, the stator further includes a bobbin 38 disposed between the stator core 54 and the stator windings 56. The bobbin 38 is made of an insulating material and includes two brackets 80 respectively placed around the two branches 60 of the stator core. The stator windings 56 are wound on two brackets 80 in two parts. The motor further includes a circuit board 82, which is fixed on the bobbin 38 in a direction substantially parallel to the branches 60. Each bracket 80 includes a tubular portion 92 and two end walls 94 respectively extending outward from both ends of the tubular portion 92. A winding space is formed between the radial outer surface of the tubular portion 92 and the axially opposite surfaces of the two end walls 94 to receive the stator winding 56.

The pump housing 14 includes a cover body 100 and a base plate 102 integrally attached to the cover body 100. The cover body 100 is hermetically connected to the base plate 102. The cover body 100 includes a top plate 108 and a side wall 110 connecting the top plate 108 and the base plate 102. The inlet 16 extends outwardly from the top plate 108 and the outlet 18 extends outwardly from the side wall 110. The pump chamber 12 is formed between the cover body 100 and the base plate 102, and the impeller 20 is rotatably disposed in the pump chamber 12.

The base plate 102 includes a rotor housing 124, and a bottom wall 122 for the pump chamber 12. An opening is defined in a middle of the bottom wall 122. The rotor housing 124 integrally extends from the opening in a direction away from the inlet 16. The rotor 26 is received in the rotor housing 124 with a gap between the outer surface of the rotor 26 and the rotor housing 124 so that the rotor 26 can rotate relative to the rotor housing 124. An end cap 126 is fixed to an end of the rotor housing 124 near the opening of the bottom wall 122. One end of the shaft 28 extends through the end cap 126 and enters into the pump chamber 12 to connect to the impeller 20 and drive the impeller 20 to rotate. Both ends of the shaft 28 can be respectively supported by the bearing 128 provided in the end cap 126 and the bearing 130 provided at an end of the rotor housing 124 away from the impeller 20.

The rotor housing 124 is fixed between the two pole portions 62, and an outer surface of the rotor housing 124 faces the pole arc surfaces 66 with an air gap defined therebetween. The motor further includes a motor cover 146 fixed to the pump housing 14. The motor cover 146 covers the stator windings 56 and the circuit board 82.

Figure 9:
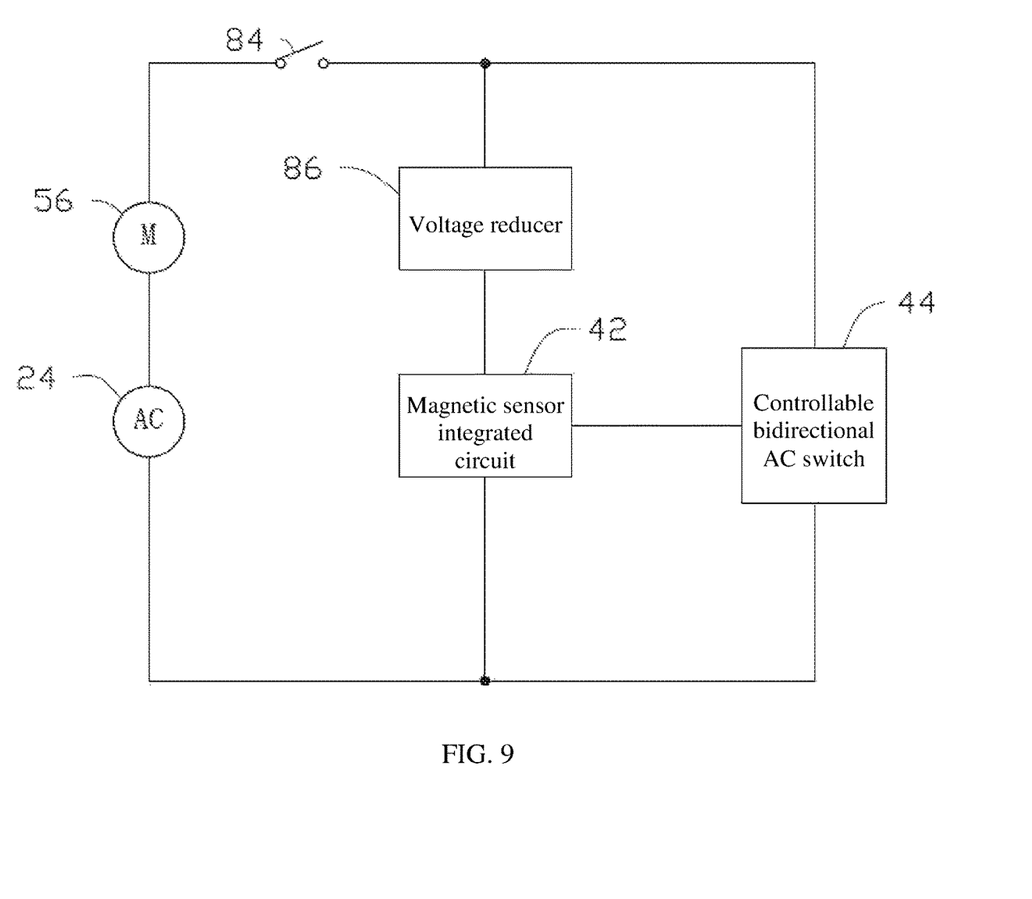
FIG. 9 illustrates a circuit diagram of a motor control circuit of an embodiment of the present application.

In the present application, a magnetic sensor integrated circuit 42 is mounted on the circuit board 82. The magnetic sensor integrated circuit 42 may be a conventional magnetic sensor integrated circuit capable of magnetic field detection and directly outputting a corresponding magnetic field detection signal, but it is not limited thereto. For example, other circuit functional modules may also be integrated on the basis of the conventional magnetic sensor integrated circuit, and other signals generated based on the magnetic field detection signal may be output. In a preferred embodiment, the circuit board 82 may be provided with a controllable bidirectional AC switch 44 (as shown in FIG. 9) that is connected in series with the stator windings 56 between an AC power supply and controlled by the magnetic sensor integrated circuit 42. The stator windings 56 can be energized in a predetermined manner by controlling the controllable bidirectional AC switch 44 to be turned on or off.

Figure 5:
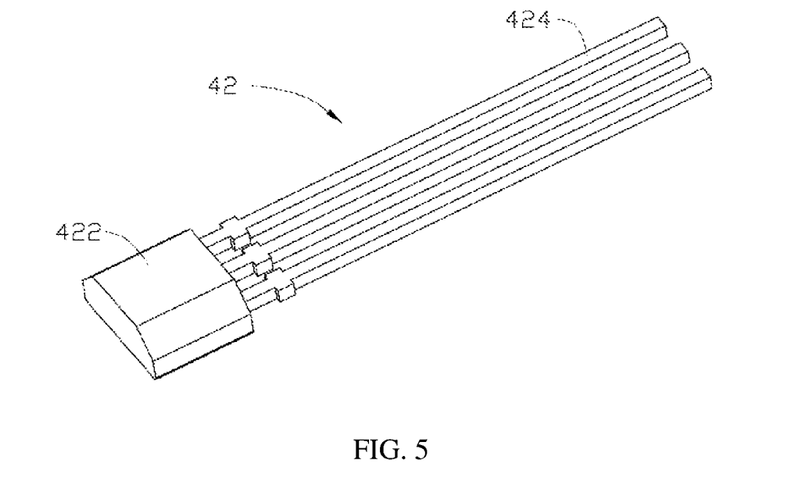
FIG. 5 illustrates a magnetic sensor integrated circuit on a circuit board of the stator of FIG. 4.
Figure 8:
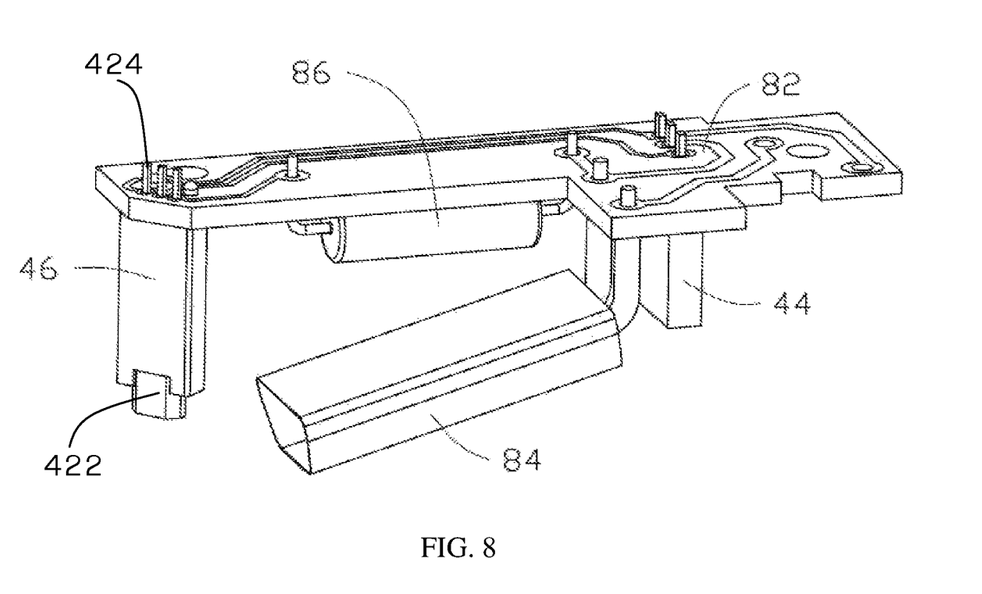
FIG. 8 illustrates the circuit board of the stator of FIG. 4.

The magnetic sensor integrated circuit 42 is magnetically coupled with the permanent magnet 30 of the rotor 26 to detect a position of the magnetic pole of the rotor. Referring to FIG. 4, FIG. 5 and FIG. 8, the magnetic sensor integrated circuit 42 includes a package housing 422 near the magnetic pole of the rotor, an electronic circuit disposed in the package housing 422, and a plurality of pins 424 extending from the package housing 422. The pins 424 are soldered to circuit board 82.

Figure 6:
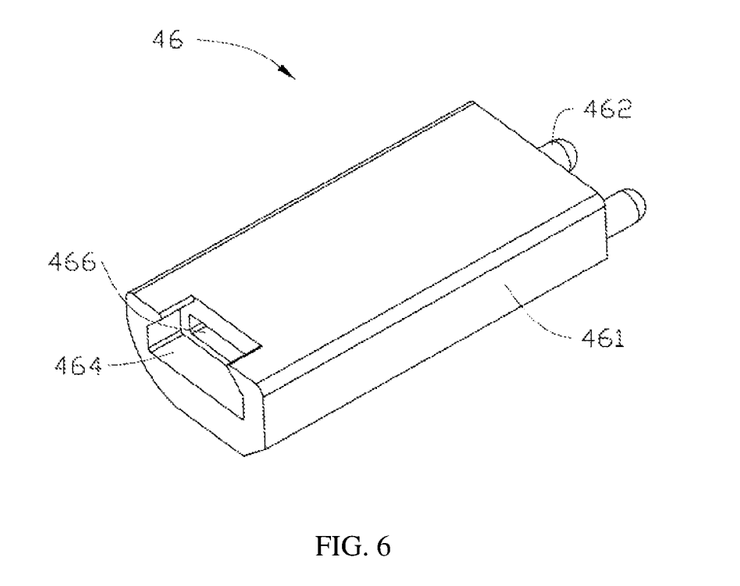
FIG. 6 illustrates a support sleeve on the circuit board of the stator of FIG. 4.
Figure 7:
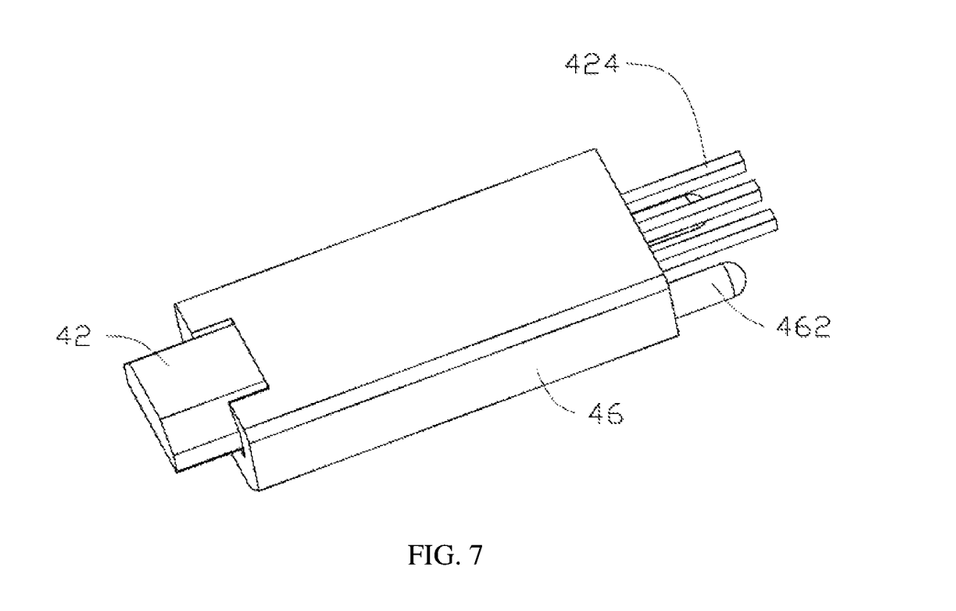
FIG. 7 is an assembled view of the magnetic sensor integrated circuit of FIG. 5 and the support sleeve of FIG. 6.

Referring to FIG. 6 and FIG. 7, in the preferred embodiment of the present application, a support sleeve 46 is placed around the magnetic sensor integrated circuit 42. The support sleeve 46 is made of a material that is not easily deformed. A main body 461 of the support sleeve 46 is a hollow structure that has a through hole 466 penetrates both ends of the main body 461 in a longitudinal direction of the main body 461. One end of the main body 461 is provided with a mounting portion 462, and the other end is provided with a groove 464. The groove 464 communicates with the through hole 466. The support sleeve 46 is fixedly mounted to the circuit board 82 through the mounting portion 462. It can be understood that the present application is not limited thereto. In other embodiments, the support sleeve may also be fixed to other parts of the stator, for example, may be integrally formed on the bobbin.

The plurality of pins 424 of the magnetic sensor integrated circuit 42 extend through the groove 464 and the through hole 466 of the support sleeve 46 and are mounted on the circuit board 82 in parallel with the mounting portion 462. The two are formed into a tight fit to be fixed to each other. The package housing 422 of the magnetic sensor integrated circuit 42 is inserted into and fixed to the groove 464 of the support sleeve 46. The pins 424 of the magnetic sensor integrated circuit 42 are elongated and have a small distance from each other, and are easily deformed when touched, which will cause the package housing 422 to move, affect the accuracy of position detection of the magnetic field of the rotor, and may even cause the pins 424 to contact each other. Configuration of the support sleeve 46 can fix the position of the package housing 422 and ensure that the pins 424 are electrically insulated from each other.

Preferably, the support sleeve 46 shields the pins 424 in the extending direction of the pins 424. An end of the package housing 422 away from the pins 424 is not covered by the support sleeve 46 to reduce or prevent the support sleeve 46 from adversely affecting the magnetic field detection. It can be understood that the above structure of the present application is applicable to various circuits with magnetic sensor integrated circuits and is not limited to the embodiments of the circuits provided in the present application.

Referring to FIG. 2, FIG. 4 and FIG. 8, in one embodiment, the circuit board 82 is further provided with a thermal protection switch 84 to provide power-off protection when the temperature of the stator windings 56 is too high and/or a voltage reducer 86. The circuit board 82 is disposed on a side of the stator core 54 away from the pump housing 14, and each electronic component on the circuit board 82 is disposed on a side of the circuit board 82 facing the stator core 54. The magnetic sensor integrated circuit 42 is disposed at one end of the circuit board 82 near the pole portions 62 of the stator, and the controllable bidirectional AC switch 44 is disposed at the other end of the circuit board 82 away from the pole portions 62 of the stator. The magnetic sensor integrated circuit 42 and the controllable bidirectional AC switch 44 are respectively disposed on sides of the two end walls 94 of the bobbin 38 facing away from the tubular portions 92. The thermal protection switch 84 and the voltage reducer 86 are disposed between the two end walls 94 of the bobbin 38. This layout can reduce the area of the circuit board 82 and reduce product costs. The voltage reducer 86 is preferably a step-down resistor.

Referring to FIG. 9, in one embodiment, the voltage reducer 86 forms a series branch in series with the magnetic sensor integrated circuit 42. The series branch forms a parallel branch in parallel with the controllable bidirectional AC switch 44, and the thermal protection switch 84, the stator windings 56 and the parallel branch are connected in series between the AC power supply 24.

Figure 10:
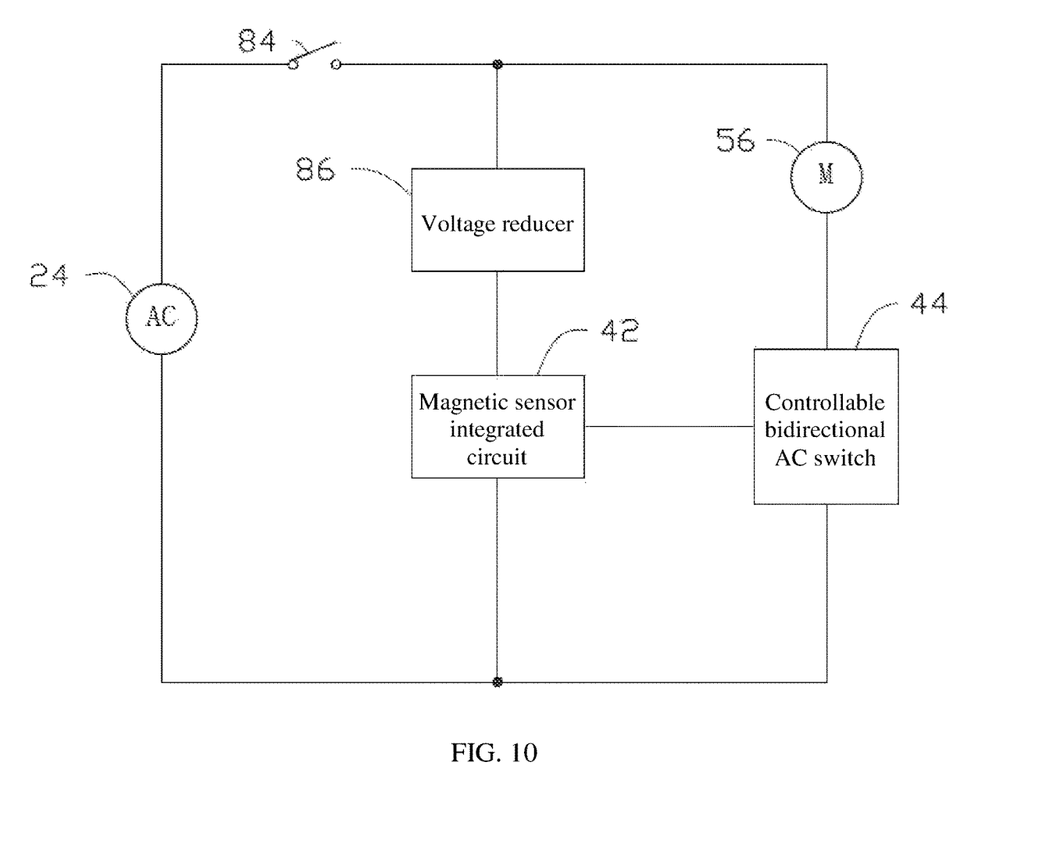
FIG. 10 illustrates a circuit diagram of a motor control circuit of another embodiment of the present application.

Referring to FIG. 10, in another embodiment, the voltage reducer 86 forms a first series branch in series with the magnetic sensor integrated circuit 42, and the stator windings 56 and the controllable bidirectional AC switch 44 form a second series branch in series. The first series branch and the second series branch are connected in parallel to form a parallel branch. The thermal protection switch 84 and the parallel branch are connected in series between the AC power supply 24.

The applicant's U.S. patent application Ser. No. 15/230,917 is incorporated into this application as a content of the present application. The circuit in the above two figures cooperates with the magnetic sensor integrated circuit disclosed in the above application to ensure that the rotor rotates in the same direction every time it is started. In fans, water pumps and other applications, the impeller driven by the rotor can use curved blades to improve the fluid efficiency of the fans, pumps, etc. With the same output, smaller motors can be used to save energy.

It can be understood that the present application is not limited to the above examples. In other embodiments, other corresponding control circuits may also be configured for the motor according to requirements. For example, a conventional magnetic sensor integrated circuit may be used and a microcontroller may be provided. The magnetic sensor integrated circuit provides magnetic field detection signals to the microcontroller, and the microcontroller controls the turn-on and turn-off of the controllable bidirectional AC switch.

The pump 10 provided by the present application is particularly suitable as a drain pump for a washing device such as a dishwasher, a washing machine, and the like. It can be understood that the motor of the present application can also be applied to other products (eg, fans) and the like, and is not limited thereto.

The foregoing descriptions are merely preferred embodiments of the present invention and are not intended to limit the present invention. Any modification, equivalent replacement and improvement made within the spirit and principle of the present invention shall be included in the protection of the present invention. Within range.

The invention claimed is:

1. A motor comprising:
a rotor; and
a stator comprising a stator core, stator windings wound around the stator core and a circuit board fixed relative to the stator core, the circuit board comprising a motor control circuit, the motor control circuit comprising a magnetic sensor integrated circuit near the magnetic poles of the rotor and magnetically coupled with the rotor to detect a position of a magnetic pole of the rotor, wherein the circuit board is also provided with a controllable bidirectional AC switch that is connected in series with the stator windings between an AC power supply and controlled by the magnetic sensor integrated circuit, the stator core comprises a bottom portion, two opposite branches extending from opposite ends of the bottom portion, and a pair of pole portions respectively extending from the two branches in a direction away from the bottom portion, the magnetic sensor integrated circuit is disposed at one end of the circuit board near the pole portions, and the controllable bidirectional AC switch is disposed at the other end of the circuit board above the bottom portion.

2. The motor of claim 1, wherein a support sleeve is placed around the magnetic sensor integrated circuit.

3. The motor of claim 2, wherein the support sleeve is mounted to the circuit board and shields the plurality of pins in the extending direction of the pins, distal ends of the pins away from the package housing are exposed out of the support sleeve.

4. The motor of claim 3, wherein at least a part of the package housing of the magnetic sensor integrated circuit is inserted into the support sleeve.

5. The motor of claim 4, wherein an end of the package housing away from the pins is exposed out of the support sleeve.

6. The motor of claim 2, wherein the support sleeve comprises a main body defining a through hole penetrating opposite ends of the main body for receiving the pins of the magnetic sensor integrated circuit, one end of the main body is provided with a mounting portion fixed to the circuit board, and the other end of the main body is provided with a groove communicating with the through hole for receiving the package housing of the magnetic sensor integrated circuit.

7. The motor of claim 1, wherein the motor is a single phase synchronous motor.

8. The motor of claim 1, wherein the stator further comprises a bobbin disposed between the stator core and the stator windings, the bobbin comprises two brackets respectively placed around the two branches, each bracket comprises two opposite end walls and a tubular portion connected between the end walls, the stator windings are wound around the tubular portions, the magnetic sensor integrated circuit and the controllable bidirectional AC switch are respectively disposed on sides of the two end walls of the bobbin facing away from the tubular portion.

9. The motor of claim 8, wherein the circuit board is further provided with a thermal protection switch and a voltage reducer, the thermal protection switch and the voltage reducer are disposed between the two end walls of the bobbin.

10. The motor of claim 1, wherein the circuit board is further provided with a thermal protection switch and a voltage reducer, the voltage reducer forms a series branch in series with the magnetic sensor integrated circuit, the series branch forms a parallel branch in parallel with the controllable bidirectional AC switch, the thermal protection switch, the stator windings and the parallel branch are connected in series between the AC power supply.

11. The motor of claim 1, wherein the circuit board is further provided with a thermal protection switch and a voltage reducer, the voltage reducer and the magnetic sensor integrated circuit form a first series branch in series, the stator windings and the controllable bidirectional AC switch form a second series branch in series, the first series branch and the second series branch are connected in parallel to form a parallel branch, the thermal protection switch and the parallel branch are connected in series between the AC power supply.

12. An electric equipment comprising the motor of claim 1.

13. The electric equipment of claim 12, wherein the electric equipment is a pump or a fan.

14. The motor of claim 1, wherein the magnetic sensor integrated circuit comprises a package housing near the magnetic poles of the rotor, an electronic circuit provided in the package housing, and a plurality of pins extending from the package housing and soldered on the circuit board.

15. A motor comprising:
a rotor; and
a stator comprising a stator core, stator windings wound around the stator core and a circuit board fixed relative to the stator core, the circuit board comprising a motor control circuit, the motor control circuit comprising a magnetic sensor integrated circuit near the magnetic poles of the rotor and magnetically coupled with the rotor to detect a position of a magnetic pole of the rotor, wherein the circuit board is also provided with a controllable bidirectional AC switch that is connected in series with the stator windings between an AC power supply and controlled by the magnetic sensor integrated circuit, the circuit board is further provided with a thermal protection switch and a voltage reducer, the voltage reducer forms a series branch in series with the magnetic sensor integrated circuit, the series branch forms a parallel branch in parallel with the controllable bidirectional AC switch, the thermal protection switch, the stator windings and the parallel branch are connected in series between the AC power supply.

16. The motor of claim 15, wherein the magnetic sensor integrated circuit comprises a package housing near the magnetic poles of the rotor, an electronic circuit provided in the package housing, and a plurality of pins extending from the package housing and soldered on the circuit board.

17. The motor of claim 15, wherein the motor is a single phase synchronous motor.

18. A motor comprising:
a rotor; and
a stator comprising a stator core, stator windings wound around the stator core and a circuit board fixed relative to the stator core, the circuit board comprising a motor control circuit, the motor control circuit comprising a magnetic sensor integrated circuit near the magnetic poles of the rotor and magnetically coupled with the rotor to detect a position of a magnetic pole of the rotor, wherein the circuit board is also provided with a controllable bidirectional AC switch that is connected in series with the stator windings between an AC power supply and controlled by the magnetic sensor integrated circuit, the circuit board is further provided with a thermal protection switch and a voltage reducer, the voltage reducer and the magnetic sensor integrated circuit form a first series branch in series, the stator windings and the controllable bidirectional AC switch form a second series branch in series, the first series branch and the second series branch are connected in parallel to form a parallel branch, the thermal protection switch and the parallel branch are connected in series between the AC power supply.

19. The motor of claim 18, wherein the magnetic sensor integrated circuit comprises a package housing near the magnetic poles of the rotor, an electronic circuit provided in the package housing, and a plurality of pins extending from the package housing and soldered on the circuit board.

20. The motor of claim 18, wherein the motor is a single phase synchronous motor.

\* \* \* \* \*